F. FANNING.
Corn Sheller.
No. 91,003.
Patented June 8, 1869.
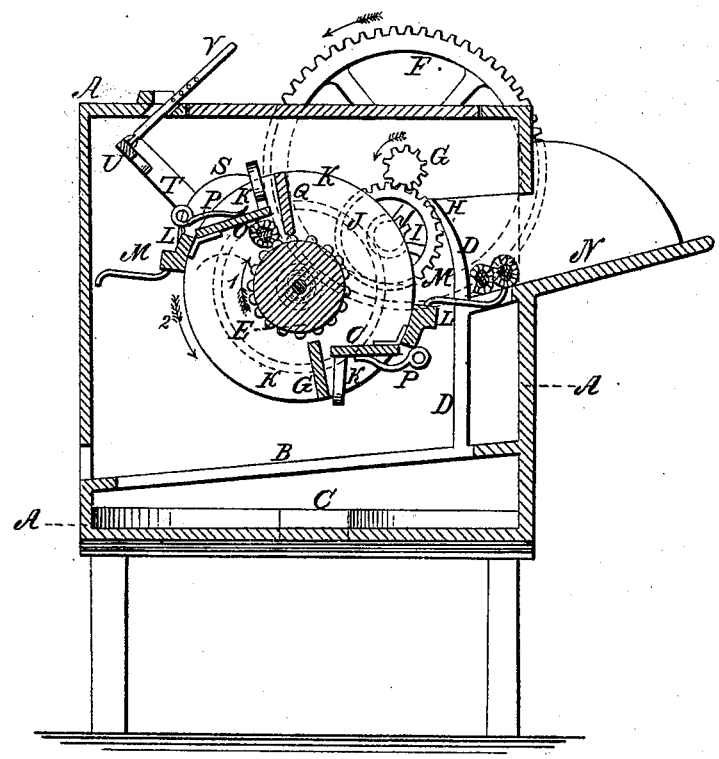

UNITED STATES PATENT OFFICE.

F. FANNING, OF ATCHISON, KANSAS.

IMPROVEMENT IN CORN-SHELLERS.

Specification forming part of Letters Patent No. 91,003, dated June 8, 1869.

*To all whom it may concern:*

Be it known that I, F. FANNING, of Atchison, in the county of Atchison and State of Kansas, have invented a new and useful Improvement in Corn-Shellers; and I do hereby declare that the following is a full, clear, and exact description thereof, which will enable others skilled in the art to make and use the same, reference being had to the accompanying drawing, forming part of this specification.

The figure is a vertical section of my improved corn-sheller.

My invention has for its object to furnish an improved corn-sheller which shall be so constructed as to shell the corn rapidly and thoroughly, and which may be readily adjusted to hold the ear in contact with the shelling-cylinder a greater or less time, according to the dampness or dryness of the corn to be shelled; and it consists in the construction and combination of various parts of the machine, as hereinafter more fully described.

A represents the case, box, or frame of the machine, in the bottom of which is placed a slotted inclined plane or grating, B, upon which the shelled corn and cobs fall, the corn passing through the grating B, with the spout C, by which it is conducted out of the machine, and the cobs passing out through an opening in the case A at the lowest end of the said grating B.

The slats of the grating B are extended up at the hopper side of the machine, and project between the hopper and the operating parts of the machine in the form of a slatted partition, D, as shown in the figure.

E is the shelling-cylinder, the surface of which is studded with spikes or teeth, by the action of which the corn is removed from the cob.

The journals of the shelling-cylinder E work in bearings in the case or frame A, and to the projecting end of one of said journals is attached a small gear-wheel, as shown in dotted lines in the figure, into the teeth of which mesh the teeth of the large crank gear-wheel F, so that the said shelling-cylinder E may be revolved rapidly in the direction of arrow 1.

The shaft of the crank gear-wheel F revolves in bearings in the case A, and to its inner end is attached a small gear-wheel, G, the teeth of which mesh into the teeth of the large gear-wheel H, to the side of which is attached, or upon it is formed, a small gear-wheel, I, the teeth of which mesh into the teeth of the large gear-wheel J, attached to the outer cylinder or drum K, as shown in dotted lines in the figure, so that the said drum or cylinder K, which is concentric with the shelling-cylinder E, may be carried around said cylinder with a slow motion and in the opposite direction from that in which the said cylinder E is revolving, as shown in the figure by arrow 2.

L are cross-bars attached to, or rather forming a part of, the drum K, to which are attached fingers M, which pass through the slots of the gratings B D, so as to raise the ears of corn from the bottom of the hopper N, carry them over the upper edge of the slatted partition or grating D, and allow them to fall in against the thrashing-cylinder E.

To the rear or lower edge of the cross-bars L are hinged the plates O, by which the ears of corn are held forward against the thrashing-cylinder E, and which plates are held forward with the necessary pressure, and are at the same time allowed to adjust themselves to the size of the ears being operated upon by the springs P, attached to the bars L, and the free ends of which rest and press against the outer sides of the said plates O.

The ears of corn, while being shelled, rest against the bars or stops Q, the ends of which are attached to the drum or cylinder K.

To the lower parts of the rear sides of the hinged plates O are attached arms R, which rest upon the edges of the end plates of the drum or cylinder K and prevent the hinged plates O from being forced so far in as to come in contact with the spikes or teeth of the thrashing-cylinder E.

The ends of the arms R project beyond the ends of the cylinder K, so that when the said cylinder has been revolved to the proper position the ends of the said arms may come in contact with and slide up the inclines or cams S, so as to raise the hinged plates O, allowing the cobs to drop out and pass from the machine.

The inclines or cams S ride upon the journals of the cylinder E, so that their position may change according to the greater or less time the ears of corn may require to be operated upon by the thrashing-cylinder, consequent upon the dryness or dampness of the corn being shelled.

To the cams or inclines S are attached, or upon them are formed, arms T, the upper ends of which are connected by a cross-bar, U, to the middle part of which is pivoted an arm or bar, V, extending up through a hole in the top of the case A, where it is adjustably secured in place by a pin passing through one or the other of the holes in the said arm or bar V, as shown in the figure.

Having thus described my invention, what I claim as new, and desire to secure by Letters Patent, is—

1. The combination of the interior toothed cylinder E, exterior drum K, cross-bars L, finger M, hinged plates O, springs P, stop-bars Q, and arms R with each other and with the gratings or racks B D, case A, and cams or inclines S, whether said cams or inclines are movable or stationary, substantially as herein shown and described, and for the purpose set forth.

2. The movable adjustable cams or inclines S, riding upon the journals of the cylinder E, and connected with the case A by the arms T, cross-bar U, and bar V, in combination with the arms R of the hinged holding-plates O, substantially as herein shown and described, and for the purpose set forth.

The above specification of my invention signed by me this 16th day of February, 1869.

F. FANNING.

Witnesses:
D. MARTIN,
J. L. SHIMPSON.